United States Patent [19]

Kawada et al.

[11] 4,268,782
[45] May 19, 1981

[54] CONTROL SYSTEM FOR A DC MOTOR

[75] Inventors: Shigeki Kawada; Yoshiki Fujioka, both of Hino; Mitsuhiko Hirota, Tokyo; Naoto Ohta, Hino, all of Japan

[73] Assignee: Fujitsu Fanuc Limited, Japan

[21] Appl. No.: 940,279

[22] Filed: Sep. 7, 1978

[30] Foreign Application Priority Data

Sep. 8, 1977 [JP] Japan .............................. 52/108666

[51] Int. Cl.³ .............................................. H02D 5/16
[52] U.S. Cl. .................................... 318/434; 318/332
[58] Field of Search ..................... 318/434, 332; 323/9

[56] References Cited

U.S. PATENT DOCUMENTS

| 3,508,132 | 4/1970 | Peterson | 318/308 |
| 3,603,856 | 9/1971 | Zalar et al. | 318/434 |
| 3,649,897 | 3/1972 | Messick | 318/434 |
| 3,868,554 | 2/1975 | Konrad | 318/434 |
| 3,955,130 | 5/1976 | Graf | 318/434 |
| 4,039,853 | 8/1977 | Koizumi et al. | 361/147 |

Primary Examiner—David Smith, Jr.
Attorney, Agent, or Firm—Staas & Halsey

[57] ABSTRACT

A system for controlling DC motors of the type employing permanent magnets as field poles. The firing phase angle of a thyristor is controlled in response to an error signal representative of an error between a commanded motor speed and an actual motor speed. For preventing demagnetization of the permanent magnets due to the armature reaction, the clamp level of the error signal is changed in accordance with the actual motor speed.

5 Claims, 11 Drawing Figures

CONTROL SYSTEM FOR A DC MOTOR

BACKGROUND OF THE INVENTION

1. Field of the Invention

This invention relates to improvements in a control system for DC motors of the type employing permanent magnets as field poles.

2. Description of the Prior Art

In a DC motor of the type employing permanent magnets as field poles, an abnormal increase in an armature current is likely to cause demagnetization of the permanent magnets by the armature reaction.

A method that has been adopted in the prior art for protecting the permanent magnets from demagnetization is to check the armature current and clamp an error voltage to be applied to a thyristor control circuit in the case of the armature current exceeding a predetermined value, thereby preventing a further increase in the firing phase angle of a thyristor to avoid a further increase in the armature current.

With this method, however, since an abnormal current detecting level of a current detector is set constant independently of actual motor speeds, demagnetization of the permanent magnets cannot be stably prevented over the whole range of the motor speed; therefore it is impossible to completely remedy the drawback of a delay in the operation of the current detector which causes the armature current exceed its rated value, resulting in the permanent magnets being demagnetized.

SUMMARY OF THE INVENTION

This invention has for its object to provide a DC motor control system in which the upper limit of the control range of the firing phase angle of a thyristor control circuit is determined in accordance with actual motor speeds to prevent an abnormal armature current, and thus avoid demagnetization of the permanent magnets.

DESCRIPTION OF THE PREFERRED EMBODIMENTS

Figures 1, 2, 3, 4:
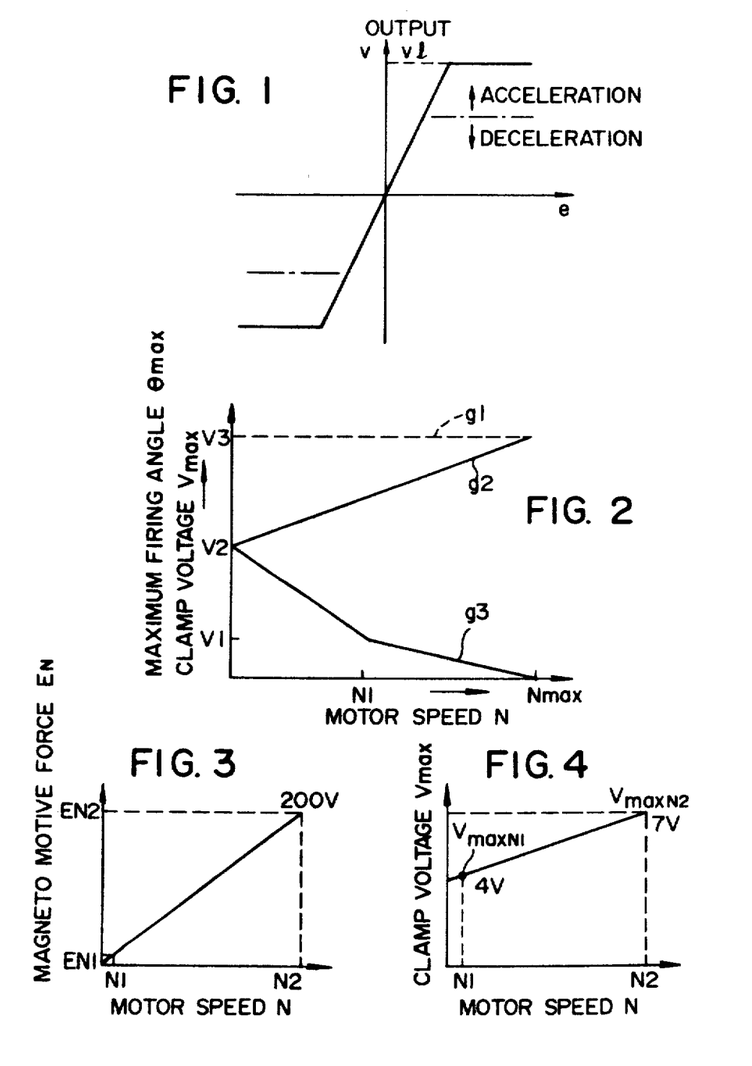
FIG. 1 is a graph showing the relationship of an error e between a commanded motor speed and an actual motor speed to an error voltage v.
FIG. 2 is a graph explanatory of setting of a clamp level of the firing phase angle during acceleration and deceleration control.
FIG. 3 is a graph explanatory of a motor magnetomotive force in relationship to motor speed.
FIG. 4 is a graph showing an example of setting of the clamp level during acceleration.

FIG. 1 shows the relationship of an error e between a commanded motor speed and an actual motor speed to an error output voltage which is applied to a thyristor firing phase angle control circuit.

In FIG. 1, the abscissa represents the error e between the motor speed command and the actual motor speed by a feedback voltage, and the ordinate represents the error output voltage v applied to the thyristor firing phase angle control circuit. The output v is provided to the firing phase angle control circuit to achieve firing of a thyristor at a phase angle proportional to the output v, as will be described later.

The error e and the output voltage v bear a proportional relationship to each other, but when the error e exceeds a certain value, the output voltage v does not increase further and is clamped at that value. The basic concept of this invention is to change the upper limit of a clamp voltage v1 of the error output voltage v, that is, the thyristor firing phase angle, in dependence on the actual speed of a DC motor.

FIG. 2 shows the relationship between the motor speed (the number of revolutions) and a clamp voltage $V_{max}$, the abscissa representing the motor speed N and the ordinate the clamp voltage $V_{max}$. The clamp voltage $V_{max}$ corresponds to a maximum phase angle $\theta_{max}$ of the firing phase of the thyristor.

The prior art employs such a clamp voltage as indicated by the broken line gl in FIG. 2 which has constant control level V3 over the entire range of the motor speed N.

On the other hand, in the system of present invention, during acceleration and steady-state operation, the clamp voltage is set to undergo a linear change from a level V2 to V3 in response to the varying motor speed N from 0 to its maximum value $N_{max}$, as indicated by the solid line g2 in FIG. 2. During deceleration, the clamp voltage is set to change in a manner, for example, from a level 0 to V1 and thence to V2, in response to the varying motor speed N from the maximum value $N_{max}$ to 0, as indicated by the solid line g3 in FIG. 2.

Referring now to FIGS. 3 to 8, a description will be given for setting the clamp voltage values as indicated by the solid lines g2 and g3 in FIG. 2.

In the armature of a DC motor, there is induced such a magnetomotive force EN as shown in FIG. 3 which is proportional to the motor speed N.

As depicted in FIG. 4, the clamp voltage during acceleration is set to be 4V in a low-speed region, for example, at a motor speed N1, and 7V at the maximum value of the motor speed, that is, a motor speed N2.

Figure 5:
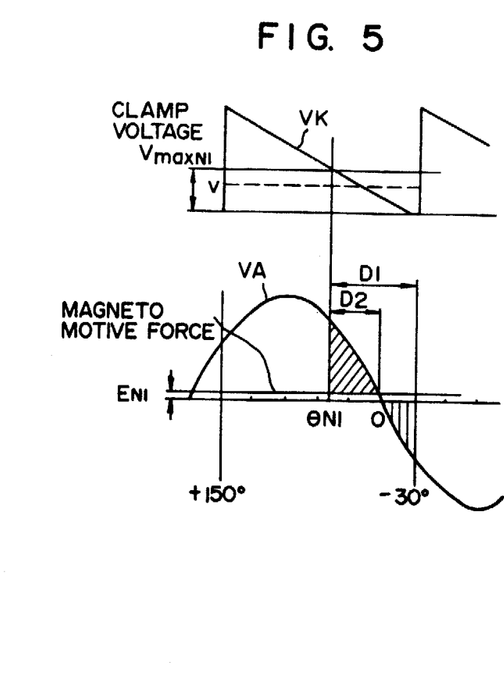
FIG. 5 is explanatory of the operation during a low speed motor drive.

The thyristor firing phase angle is controlled in relationship to the error voltage v in such a manner during a low speed motor drive as shown in FIG. 5. That is, the thyristor is fired at the moment when the error voltage v coincides with a sawtooth wave VK linearly varying from a maximum value to zero in the range of +150° to −30° of an AC power source voltage VA. As a consequence, the control of the thyristor firing phase angle is possible in the range of +150° to −30°. In the case of a low speed motor operation, since a magnetomotive force EN1 of the armature is small, the maximum value of the firing phase angle is restricted to $\theta_{N1}$. In this instance, a current indicated by hatching only in a range D2 is applied to the armature of the motor. Namely, in the case of FIG. 5, the variable width of the error voltage v is selected to range from 0 to $V_{maxN1}$, and it is arranged that the firing phase angle can be controlled in a range D1 and may reach its maximum value $\theta_{N1}$ when the error voltage v is $V_{maxN1}$. As the magnetomotive force of the armature increases with an increase in the motor speed, the clamp voltage is also raised correspondingly.

Figure 6:
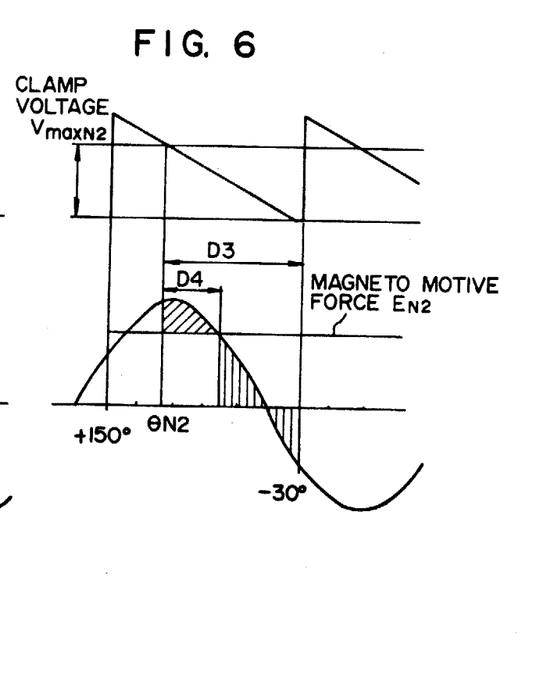
FIG. 6 is explanatory of the operation during a high speed motor drive.

As illustrated in FIG. 6 when the motor is driven at high speed, the magnetomotive force of the armature rises up to EN2, so that the firing phase angle control range must be extended further toward +150° as compared with the control range in the case of the low-speed operation. In the case of FIG. 6, the value of the error voltage v is clamped at $V_{maxN2}$ lest the maximum value of the firing phase angle should exceed $\theta_{N2}$. As a result of this, the firing phase angle can be controlled in a range D3, and a current indicated by hatching in a range D4 is applied to the armature of the motor.

As described above, in the case of the motor being driven at low speed, the upper limit of the firing phase angle may be small. Firing control at a larger phase angle is required with an increase in the motor speed. Especially during the low-speed drive, if the error voltage abnormally rises due to a malfunction of a current limiter or the like, firing takes place at a large phase angle to apply a large current to the motor, causing the permanent magnets to be demagnetized. If, however, the upper limit of the firing phase angle is fixed at the angle position which is most suitable to the low-speed drive, the firing phase angle control range in the high-speed drive becomes very narrow, and current control becomes impossible.

In the system of this invention, during acceleration control, the clamp voltage or the maximum phase angle is varied in accordance with motor speeds and therefore controlled to be small in the low-speed region and large in the high-speed region.

Figure 7:
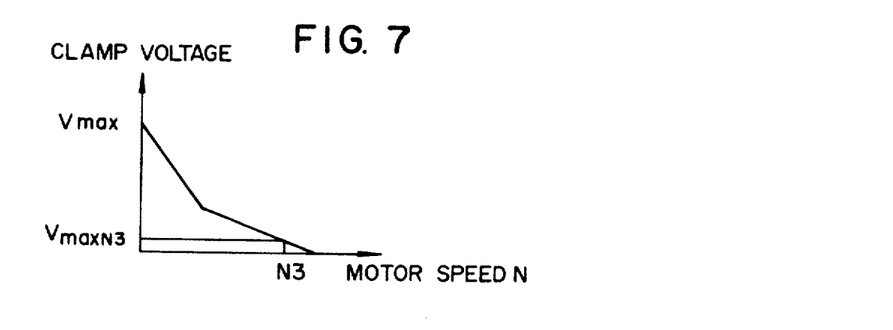
FIG. 7 is a graph showing an example of setting of the clamp level during deceleration.
Figure 8:
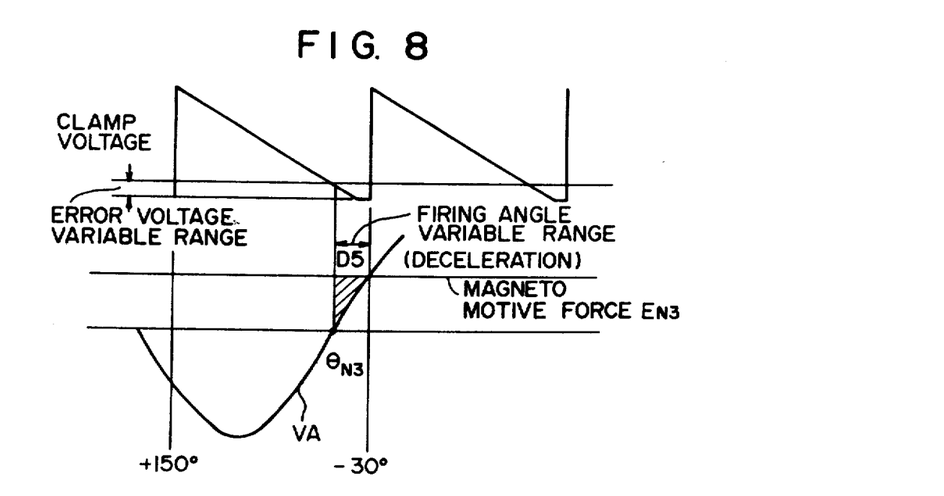
FIG. 8 is explanatory of the operation during deceleration.

Turning next to FIGS. 7 and 8, the deceleration control will be described.

As shown in FIG. 7, in the case of deceleration control, the clamp level is set to gradually increase from zero as the motor speed varies from the high-speed to the low-speed region. In the example of FIG. 7, when the motor speed is N3, the clamp voltage is limited to $V_{maxN3}$.

In the case of decelerating the motor being driven at high speed, since the command voltage is inverted, the error voltage v is inverted in polarity, and phase control is achieved in the negative half cycle of the AC power source. In this instance, the armature magnetomotive force EN3 is reverse in polarity from the AC voltage VA, so that it is possible to provide a sufficient current even if the firing phase angle range is relatively narrow. Accordingly, in the examples of FIGS. 7 and 8, when the motor speed is N3, the clamp voltage is clamped at $V_{maxN3}$, and the upper limit of the firing phase angle control is set at $\theta_{N3}$. In other words, the firing phase angle control is possible in a range D5. This prevents during deceleration of the motor being driven at high speed, the firing phase angle from increasing abnormally to cause a large current in the armature.

Figure 9:
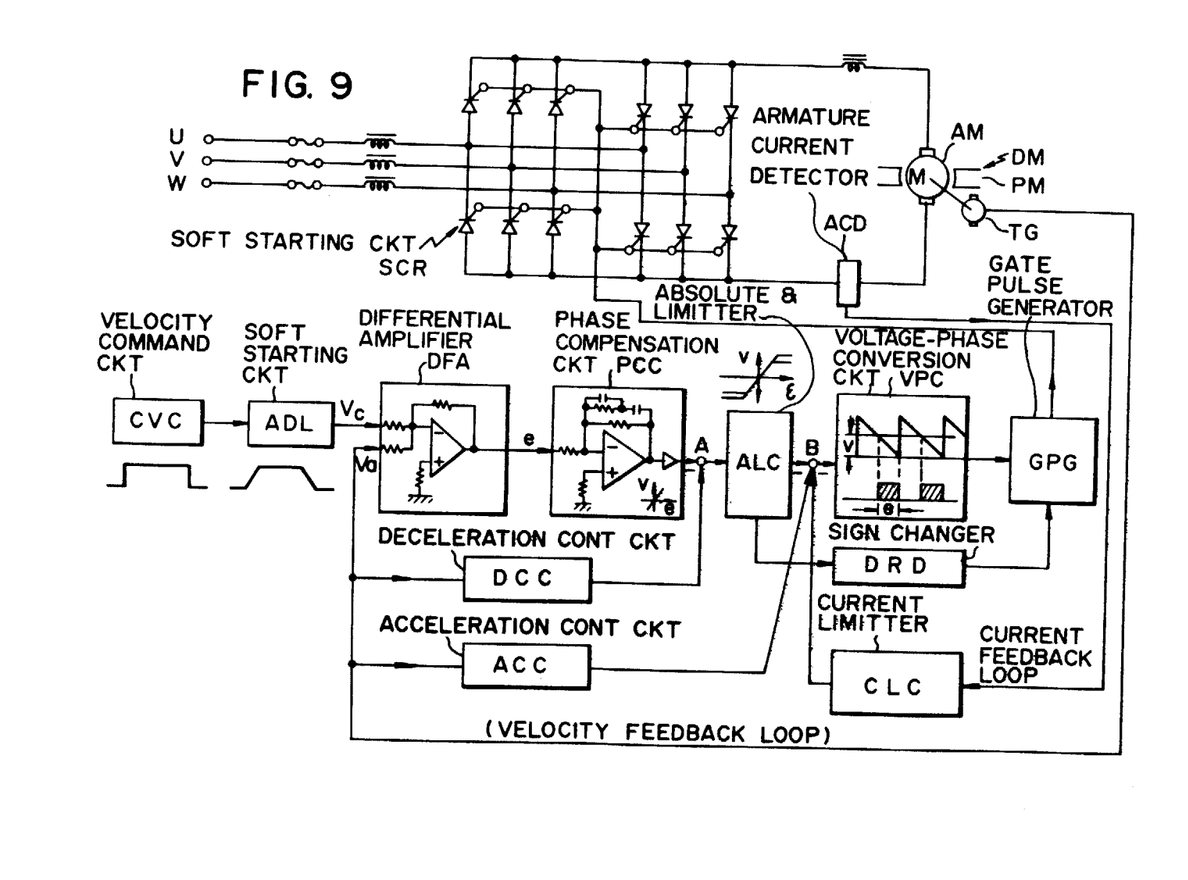
FIG. 9 is a block diagram illustrating a DC motor control system embodying this invention.

FIG. 9 illustrates the DC motor control system of this invention, which has the feature that a deceleration control circuit DCC and an acceleration control circuit ACC are added to a known DC motor drive circuit.

A DC motor DM is composed of fields poles including permanent magnets M and an armature AM and is provided with an armature current detector ACD and an armature rotational speed detector TG.

A speed or velocity command circuit CVC provides a voltage signal indicating a commanded speed, which signal is converted by a soft starting circuit ADL to a voltage signal Vc. Signal Vc rises and falls less sharply than the abovesaid signal and is applied to a differential amplifier DFA. The differential amplifier DFA is also supplied with a voltage signal Va proportional to the speed of the DC motor DM, and produces an error signal e represented as (Vc-Va) or the difference between the signals Vc and Va. The error signal e is applied to a phase compensation circuit PCC. The phase compensation circuit PCC is to remove specific frequency components such as noises or the like and provides an error voltage v proportional to the abovesaid error signal e. An absolute and limiter circuit ALC produces the absolute value of the error voltage v and has the function of limiting the absolute value so that it may not exceed a certain value.

A voltage-phase conversion circuit VPC compares the error voltage v with a sawtooth wave having the same period as and a predetermined relationship to an AC power source voltage described later, thereby to determine a predetermined firing phase angle.

A sign changer DRD controls a gate pulse generator GPG in accordance with the polarity of the input to the absolute and limiter circuit ALC, that is the error voltage v. The gate pulse generator GPG generates a gate pulse for firing a thyristor at the phase angle position determined by the voltage-phase converter VPC, causing the thyristor to be fired in accordance with the output from the sign changer DRD.

A thyristor circuit SCR is connected between a three phase alternative power supply U, V and W and the DC motor DM to form a three-phase full-wave antiparallel circuit. A current limiter CLC responds to a voltage signal from the armature current detector ACD when the armature current rises above a certain value, and serves to prevent a further increase in the output voltage from the absolute and limiter circuit ALC, that is, the error voltage v.

The above is the known DC motor control circuit. The firing phase angle of the thyristor is controlled in such a manner that the command speed voltage Vc and the motor speed feedback voltage Va agree with each other, and the motor is controlled to be driven at the commanded speed. By a current feedback loop composed of the armature current detector ACD and the current limiter CLC, the armature current is controlled not to exceed a predetermined value.

In this invention, however, for the aforesaid reasons, the variable range of the error voltage v is controlled by the acceleration control circuit ACC and the deceleration control circuit DCC which are responsive to the motor speed signal from detector TG.

The acceleration control circuit ACC sets the clamp level of the error voltage v in accordance with motor speeds, as indicated by the full line g2 in FIG. 2, whereas the deceleration control circuit DCC also sets the clamp level of the error voltage v in accordance with motor speeds, as indicated by the full line g3 in FIG. 2.

Figure 10:
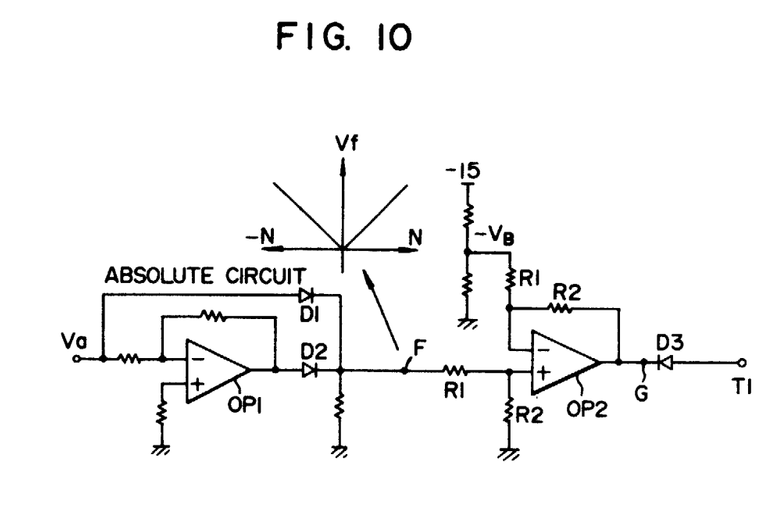
FIG. 10 shows an acceleration control circuit for the embodiment of FIG. 9.

FIG. 10 shows an example of the acceleration control circuit ACC for the embodiment of the motor control system shown in FIG. 9. The circuit ACC comprises operational amplifiers OP1 and OP2, diodes D1 through D3 and resistors R1 and R2.

The first half of this circuit to the point F constitutes an absolute value circuit, and when supplied with an input voltage, that is, the voltage Va proportional to the motor speed, the circuit derives at the point F a voltage Vf proportional to the absolute value of the motor speed. The latter half of the circuit following the point F forms a level shift circuit, which shifts an output voltage at a zero speed point by a value determined by a fixed voltage $V_B$ and the resistors R1 and R2, that is, $(R_2/R_1(V_B)$. Namely, an output voltage $V_{out} = (R_2/R_1(V_f + V_B)$ is derived at the point G. An output terminal T1 of the acceleration control circuit ACC is connected with the point B shown in FIG. 9. Since the diode D3 is connected in backward direction with respect to the output terminal T1, the output voltage from the absolute and limiter circuit ALC in FIG. 9, that is, the error voltage v, is clamped by the output voltage $V_{out}$ of the acceleration control circuit ACC.

Figure 11:
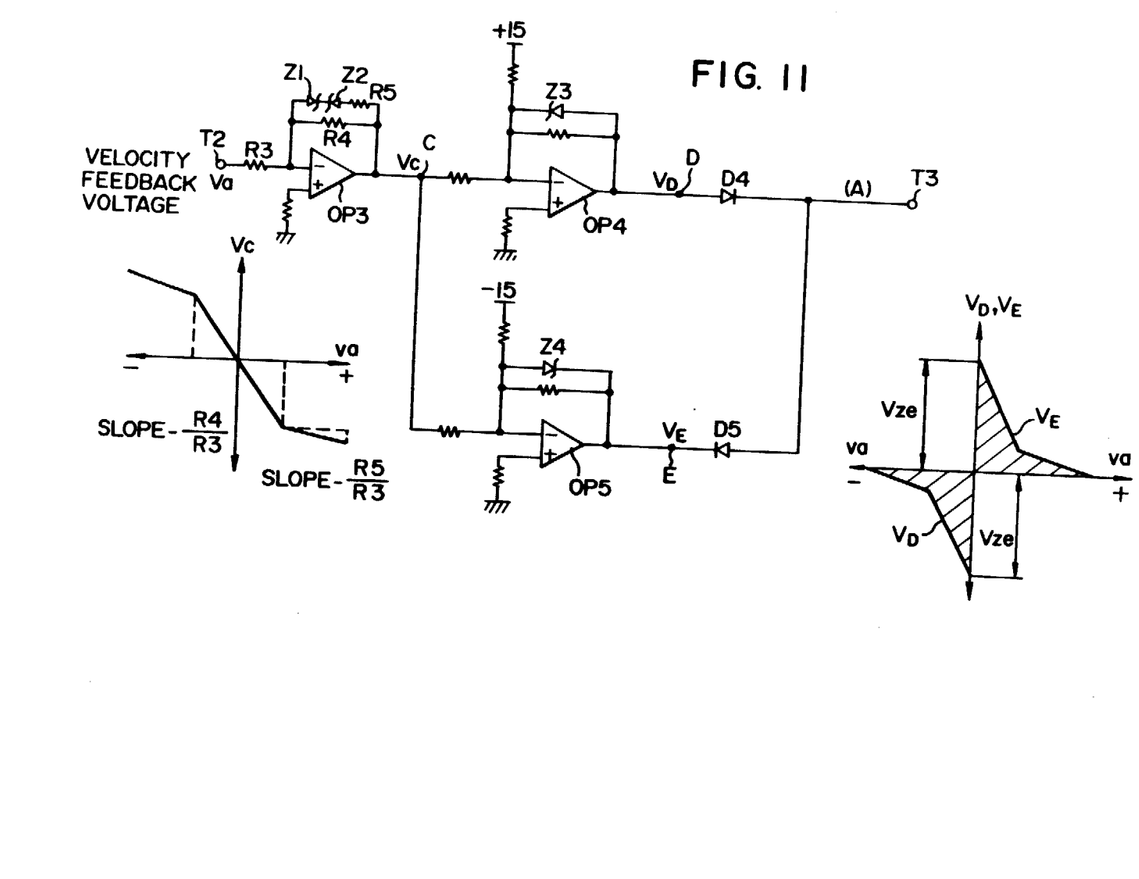
FIG. 11 illustrates a deceleration control circuit for the embodiment of FIG. 9.

FIG. 11 illustrates an example of the deceleration control circuit DCC for the embodiment of the motor control system shown in FIG. 9. In FIG. 11, reference characters OP3 to OP5 indicate operational amplifiers; Z1 to Z4 designate Zener diodes; R3 to R5 identify resistors; and D4 and D5 denote diodes.

The illustrated DCC circuit makes up one function generator, which is supplied at its input terminal T2 with the motor speed detection voltage Va and has its output terminal T3 connected with the point A shown in FIG. 3. The output voltage at the output point C of the operational amplifier OP3 varies with a gradient $-R_4/R_3$ in proportion to the input voltage Va when the voltage Va is below a certain value and linearly increases with a gradient $-R_5/R_3$ when the input voltage Va rises above the certain value. Voltages $V_D$ and $V_E$ at the respective output points D and E of the operational amplifiers OP4 and OP5 change as shown in FIG. 11. When the voltage $V_D$ assumes a negative value and the DC motor is driven in its forward direction, that is, in the negative region of the detection voltage Va, the value of the voltage $V_D$ increases from zero in the negative direction as the absolute value of the voltage Va shifts from its maximum value toward zero, and the voltage $V_D$ becomes a negative voltage which agrees with a Zener voltage $V_{zc}$ when the voltage Va reaches zero.

The output voltage $V_E$ at the output point E varies in the positive direction. When the DC motor is driven in its backward direction, that is, in the positive region of the detection voltage $V_a$, the voltage $V_E$ is at its zero level when the voltage $V_a$ is maximum, and then increases to become a positive voltage which agrees with a tenor voltage $V_{ze}$ when the voltage $V_a$ is zero.

The abovesaid output points D and E are connected to the output terminal T3 via the forward diode D4 and the backward diode D5, respectively, and thence connected to the point A shown in FIG. 9. Accordingly, the error voltage at the point A in FIG. 9 becomes a negative voltage when the command voltage is reduced to decelerate the motor being driven at high speed in the forward direction. However, this voltage is clamped by the clamp voltage $V_D$ shown in FIG. 11 and hence is prevented from abruptly becoming a large negative voltage. Therefore, it is possible to prevent the firing phase angle from suddenly increasing to genetate an overcurrent.

When the absolute value of the command voltage is reduced to decelerate the motor being driven at high speed in the backward direction, the error voltage at the point A becomes positive but is clamped by the voltage $V_E$ at the point E in FIG. 11, so that there is no possibility of the firing phase angle abruptly becoming large to produce a large current. The reason for which the clamp level during deceleration is made nonlinear is that the phase angle must be made small for deceleration during the high-speed motor drive. However, same results can be obtained even if the clamp level is made linear.

As has been described above, in the present invention the upper limit of the error voltage or the firing phase angle is clamped in accordance with actual motor speeds. Accordingly it is possible to prevent the armature current from becoming excessive and, thus, avoid demagnetization of the permanent magnets. Further, in the case where a current limiter is inoperable or has a delayed response, an overcurrent can be avoided.

It will be apparent that many modifications and variations may be effected without departing from the scope of the novel concepts of this invention.

What is claimed is:

1. A control system for a DC motor employing field poles of permanent magnets and armature comprising:
    (a) means for providing an error signal representative of the difference between a commanded motor speed and an actual motor speed;
    (b) a thyristor circuit for regulating the armature current of the motor by controlling the firing phase angle of a thyristor in response to the error signal;
    (c) a motor speed detector; and
    (d) circuit means for preventing demagnetization of the magnets by armature reactive during different actual motor speed conditions, wherein said means varies a clamp level of the error signal to restrict the upper limit of the firing phase angle of the thyristor in a predetermined manner in respose to the actual detected motor speed condition, said clamp level varying means including:
        (i) a deceleration control circuit responsive solely to said motor speed detector for setting the clamp level of the error signal to predetermined values in accord with deceleration conditions under different motor speeds for preventing demagnetization of the magnets by armature reaction; and
        (ii) an acceleration control circuit responsive solely to said motor speed detector for setting the clamp level of the error signal to predetermined values in accord with acceleration conditions under different motor speeds for preventing demagnetization of said magnets by armature reaction.

2. The control system of claim 1 further comprising:
    a differential amplifier for providing an error signal corresponding to the difference between the detected output from the motor speed detector and a command velocity;
    a phase compensation circuit for removing a noise or like frequency component from the output of the differential amplifier and for providing an error voltage proportional to the error signal;
    an absolute circuit responsive to the phase compensation circuit and to the deceleration control circuit for providing an absolute value of the error voltage and a signal decision signal;
    a voltage-phase conversion circuit responsive to the absolute circuit and to the acceleration control circuit for providing a firing phase angle signal corresponding to an absolute value of the error voltage;

a gate pulse generator responsive to the firing phase angle signal from the voltage-phase conversion circuit for generating gate pulses for controlling the firing phase angle of the thyristor of the thyristor circuit;

a sign changer responsive to the sign decision signal from the absolute circuit to selectively apply the gate pulses from the gate pulse generator to the thyristor of the thyristor circuit; and wherein the clamp level of the error voltage is varied in accordance with the actual speed of the DC motor to restrict the upper limit of the firing phase angle of the thyristor circuit, thereby preventing the armature current from becoming an over-current to demagnetize the permanent magnets of the field poles.

3. The control system of claim 1 or 2 further comprising a current feedback circuit having an armature current detector for detecting armature current of the motor and a current limiter responsive to the detected signal from the armature current detector for limiting the error signal when the armature current rises above a predetermined value for preventing the armature current from further increasing.

4. The control system of claim 1 or 2 wherein the acceleration control circuit increases the clamp level value of the error signal as the actual motor speed rises from a low-speed to a high-speed region during an acceleration condition and the deceleration control circuit increases the clamp level value of the error signal as the actual motor speed shifts from a high-speed region to a low-speed region during a deceleration condition.

5. The control system of claim 4 wherein said acceleration control circuit sets the clamp level of the error signal low in the low-speed region and high in the high-speed region during an acceleration condition and wherein said deceleration control circuit sets the clamp level low in the high-speed region and increases the clamp level gradually when the motor speed shifts toward the low speed region during a deceleration condition.

* * * * *